United States Patent [19]
Jensen

[11] Patent Number: 5,969,833
[45] Date of Patent: Oct. 19, 1999

[54] MONITORING SYSTEM USING AN OPTICAL SIDE TONE AS A TEST SIGNAL

[75] Inventor: Richard A. Jensen, Eatontown, N.J.

[73] Assignee: Tyco Submarine Systems Ltd., Morristown, N.J.

[21] Appl. No.: 08/728,515

[22] Filed: Oct. 9, 1996

[51] Int. Cl.[6] .................................................. H04B 10/08
[52] U.S. Cl. ........................................ 359/110; 359/177
[58] Field of Search .................................. 359/110, 177, 359/176, 175, 174, 179, 163, 341; 370/242, 243, 343

[56] References Cited

U.S. PATENT DOCUMENTS

| | | | |
|---|---|---|---|
| 4,586,186 | 4/1986 | Anderson . | |
| 4,633,464 | 12/1986 | Anderson . | |
| 5,485,299 | 1/1996 | Jones | 359/177 |
| 5,528,404 | 6/1996 | Mackichan | 359/177 |
| 5,654,816 | 8/1997 | Fishman | 359/177 |
| 5,703,711 | 12/1997 | Hamada | 359/341 |

OTHER PUBLICATIONS

Novel tehnique for monitoring long–haul undersea opt–amp systems. OFC '94, vol. 4 Feb. 1994 Technical Digest.

*Primary Examiner*—Rafael Bacares
*Attorney, Agent, or Firm*—Mark K. Young

[57] ABSTRACT

An improved monitoring system for monitoring a fiber optic transmission system using optical side tones. The monitoring system includes a line monitoring equipment (LME) connected to a portion of an optical transmission system. The LME includes a pseudo-random sequence (PRS) tone generator for generating a PRS tone, a laser transmitter for transmitting an LME optical side tone based on the PRS tone. The LME includes a delay system for delaying the PRS tones, an optical filter for passing only the wavelength of the LME side tone. A plurality of data channels are transmitted over the system using WDM. A coupler is used to combine the WDM data with the LME side tone. A repeater having an optical loopback coupler returns a portion of the combined signal to the LME. The comparator/correlator correlates the delayed PRS tones with the LME side tone returned by each repeater.

17 Claims, 2 Drawing Sheets

MONITORING SYSTEM USING AN OPTICAL SIDE TONE AS A TEST SIGNAL

BACKGROUND

The present invention relates to communication systems and more particularly to a system for monitoring a fiber optic transmission system using an optical side tone as a test signal.

In long distance fiber optic communication systems it is important to monitor the health of the system. For example, monitoring can be used to detect faults or breaks in the fiber optic cable, faulty repeaters or amplifiers or other problems with the system.

Prior art monitoring techniques include the use a testing system which generates a test signal and modulating the test signal onto a single channel (or wavelength) with the transmitted data signal. For example, the data signal may be amplitude modulated by the test signal. A loop-back coupler within an optical amplifier or repeater located downstream is used to return a portion of the transmitted signal (data signal plus test signal modulation) to the testing system. The testing system then separates the test signal from the data signal and processes the test signal to examine the health of the transmission system. U.S. Pat. Nos. 4,586,186 and 4,633,464 to Cleo Anderson et al. and assigned to AT&T disclose a similar technique to modulate test response information from a repeater onto the main data signal to monitor the health of the system.

There are several disadvantages and drawbacks, however, with the prior art monitoring systems. Due to ordinary losses or attenuation of signals in the fiber optic transmission systems (due to absorption, scattering, etc.), data signals must be amplified at periodic intervals. Because the test signal is modulated onto the data signal, the test signal modulation will further impair some of the bits of the data signal.

For example, FIG. 1A illustrates the test signal 12 and the data signal ("1"s and "0"s) prior to modulation. Initially, data bit 10 is above the threshold level 14 and therefore is a "1." As shown in FIG. 1B, amplitude modulating the data signal with the test signal can cause the amplitude of data bit 10 to significantly decrease. Due to this interference from the test signal modulation combined with the ordinary attenuation of the data signal, the amplitude of data bit 10 may decline below the threshold level for a "1," resulting in an erroneous bit (FIG. 1B). Consequently, prior art monitoring systems require additional optical amplifiers or repeaters to compensate for losses resulting from test signal modulation.

Moreover, the prior art monitoring systems described above are incapable of simultaneously monitoring more than a single channel. To increase information capacity, two or more wavelengths (or channels) may be used to carry information over the same optical fiber. This is known as wavelength-division multiplexing (WDM). The prior art monitoring technique described above uses a test signal having the same wavelength as the data signal, and therefore, can test only a single channel at a time. A separate testing system for each wavelength or channel would be required to simultaneously monitor multiple channels using the prior art technique. As a result, such a system would have a prohibitively high cost.

Therefore, a need has arisen for a monitoring system that does not attenuate data signals and which is capable of simultaneously monitoring multiple channels (wavelengths) on an optical fiber.

SUMMARY OF THE INVENTION

The monitoring system of the present invention improves upon existing monitoring systems by providing a monitoring system that impairs data signals significantly less than prior art systems.

The monitoring system of the present invention also provides a monitoring technique that can be used to simultaneously monitor a plurality of channels.

The monitoring system of the present invention includes a line monitoring equipment (LME) for monitoring the health of a telecommunications transmission system, such as a fiber optic transmission system. The LME comprises a pseudo-random sequence (PRS) tone generator generating a PRS tone and a laser transmitter connected to the tone generator for generating an LME side tone based on the PRS tone. The LME further includes an optical filter for passing only the frequency of the LME side tone and a delay system connected to the tone generator.

The LME also includes a comparator/correlator for correlating an output of the delay system with an output of the optical filter.

The monitoring system of the present invention also includes an optical coupler combining the test signal with one or more data signals into a combined signal. Each data signal has its own data channel. To prevent attenuation or degradation of the data signal, the LME side tone has a frequency outside the frequency bandwidth of each data channel.

The monitoring system also includes a repeater connected to the optical coupler and having an optical loopback coupler. The optical loopback coupler returns a portion of the combined signal to the optical filter of the LME. The filter passes the wavelength of the LME side tone to the comparator/correlator.

A delay system is connected to the PRS tone generator and the comparator/correlator for delaying the PRS tone based on a location of the repeater. The PRS tone is delayed a separate time, $t_N$, proportional to the distance, $d_N$, of the delay path for each repeater.

A comparator/correlator outputs a result of the correlation operation that can be used by a computer or other system for monitoring the fiber optic transmission system, including detecting and diagnosing the location of faults or other problems.

DETAILED DESCRIPTION

Figure 1A:
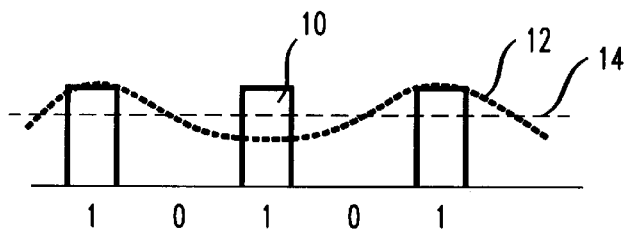
FIGS. 1A and 1B illustrates a prior art monitoring technique that uses amplitude modulation.
Figure 1B:
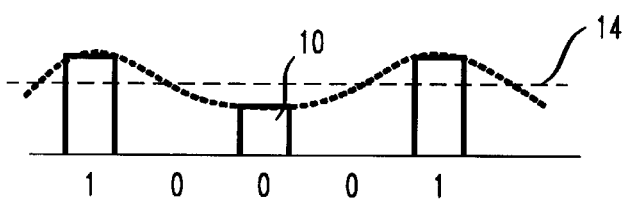
Figure 2:
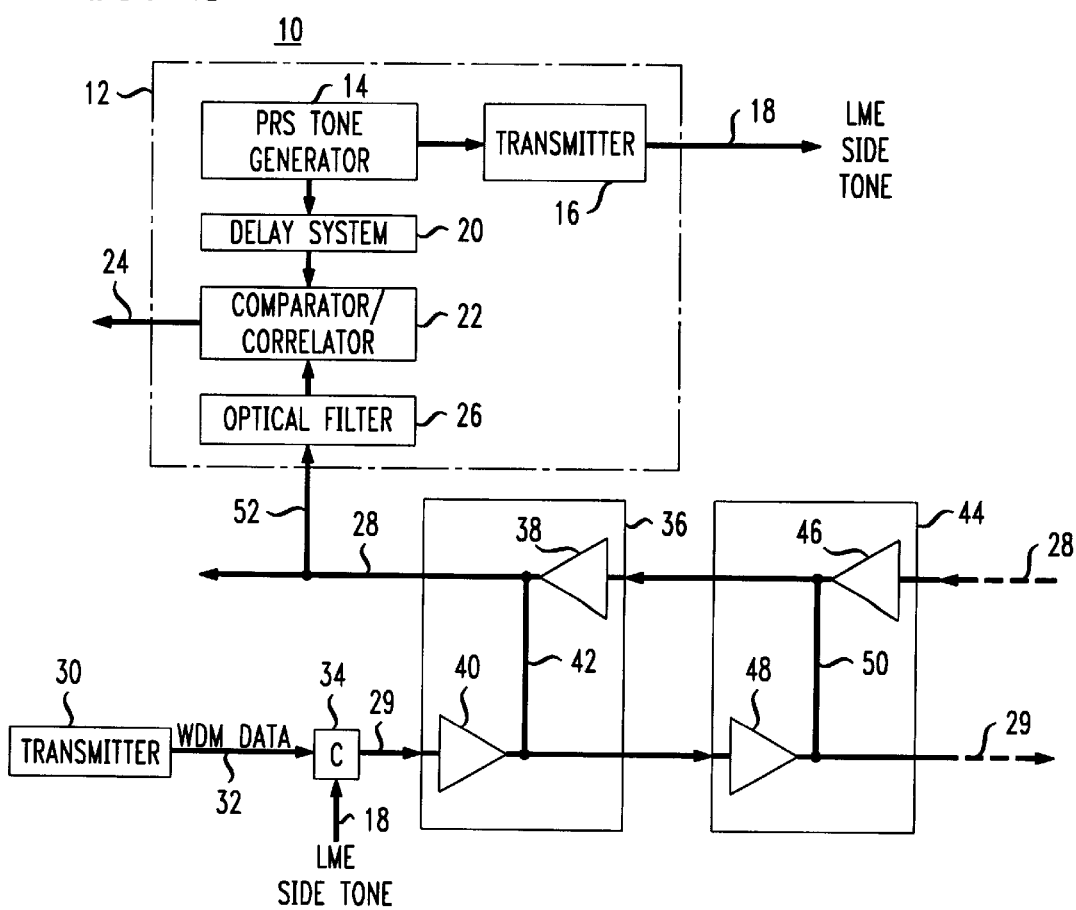
FIG. 2 illustrates a block diagram of a monitoring system according to an embodiment of the present invention.

FIG. 2 illustrates a monitoring system 10 according to the present invention. Monitoring system 10 includes a line monitoring equipment (LME) 12 for monitoring the health of a telecommunications transmission system, such as a fiber optic transmission system. LME 12 includes pseudo-random sequence (PRS) tone generator 14 connected to laser transmitter 16 for generating and outputting a pseudo-random sequence of tones. Laser transmitter 16 generates an LME side tone 18 based on the tones generated by PRS tone generator 14. As described in greater detail below, LME side tone 18 is used as a test tone by LME 12 to monitor the health of a fiber optic transmission system.

LME 12 also includes a delay system 20 connected to PRS tone generator 14 for delaying the tones received from PRS tone generator 14. LME 12 further includes an optical filter 26 for selectively transmitting one or more wavelengths or channels, while blocking the transmission of other wavelengths.

Comparator/correlator 22 is connected to delay system 20 and optical filter 26. Comparator/correlator 22 correlates the outputs of optical filter 26 and delay system 20 using well known digital signal processing techniques. Comparator/correlator 22 outputs a result 24 of the correlation operation which is used by a computer or other systems (not shown) to diagnose faults or problems in the optical transmission system.

LME 12 is connected to a portion of an optical transmission system. The optical transmission system includes a laser transmitter 30 and an optical fiber pair, including fibers 28 and 29, for carrying optical signals. Fibers 28 and 29 can be the long distance optical fiber lines for deployment, for example, under the ocean. Optical fibers 28 and 29 are unidirectional fibers and carry signals in opposite directions. Fibers 28 and 29 together provide a bidrectional path for transmitting signals. While the monitoring system according to a disclosed embodiment of the present invention monitors a transmission system that includes two unidirectional fibers 28 and 29, the present invention may be used to monitor transmission systems employing a single bidirectional fiber.

Laser transmitter 30 transmits optical data on a plurality of channels (or wavelengths) over fiber 29. Laser transmitter 30 can comprise a plurality of laser transmitters each transmitting an optical data signal over fiber 29 using a different channel or wavelength. A plurality of data signals each at a different wavelength are sent over fiber 29 using wavelength-division multiplexing (WDM). Alternatively, only a single channel of data may be carried on fiber 29. Similarly, WDM data signals may be carried over fiber 28, but traveling in a direction opposite of those signals on fiber 29.

A coupler 34 combines the WDM data 32 from transmitter 30 and LME side tone 18 from transmitter 16 and outputs this combined signal for transmission onto fiber 29. A first optical repeater 36 receives the combined signal from coupler 34. Repeater 36 includes amplifiers 38 and 40 for amplifying optical signals transmitted over fibers 28 and 29, respectively. Repeater 36 also includes a loop-back coupler 42 which returns a portion of the signal being transmitted on fiber 29 to fiber 28 for transmission to LME 12. Similarly, a second optical repeater 44 includes amplifiers 46 and 48 and loop-back coupler 50. Additional optical repeaters, including their associated loop-back couplers, are connected to fibers 28 and 29 for periodically amplifying and returning signals thereon.

Signal 52 is connected to the end of fiber 28 and carries all signals present on fiber 28, including the combined WDM data 32 and LME side tones 18 returned by loop-back couplers 42 and 50 returned over fiber 28. Signal 52 is input to optical filter 26. Optical filter 26 is wavelength selective and passes only the wavelength of LME side tone 18. Comparator/correlator 22 then correlates the returned LME side tone with the delayed PRS tones. Comparator/correlator 22 may correlate electrical signals or optical signals. Where comparator/correlator 22 correlates electrical signals, LME 12 further includes an optical decoder connected between optical filter 26 and the comparator/correlator 22 for converting the optical signals output by filter 26 into electrical signals.

Figure 3A:
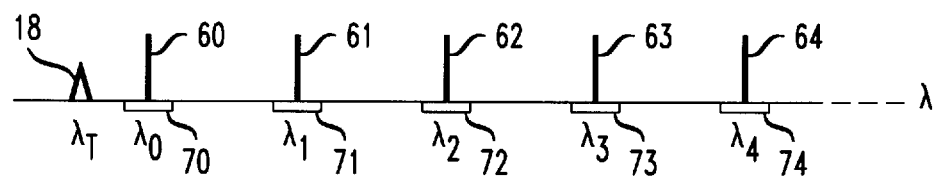
FIGS. 3A and 3B illustrates diagrams illustrating the transmission of data channels and a LME side tone according to an embodiment of the present invention.
Figure 3B:
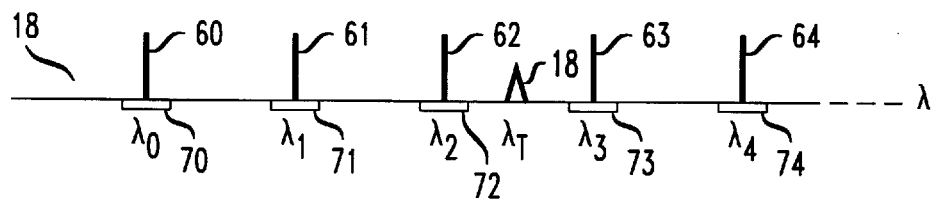

Referring to FIGS. 2, 3A and 3B, the monitoring system of FIG. 2 may be used to simultaneously monitor a plurality of channels on both fibers 28 and 29 without attenuating the WDM data 32. FIG. 3A illustrates an example of the spectrum of channels transmitted over the optical fiber 29 in FIG. 2. The different data channels transmitted on fiber 29 by laser 30 using WDM include data channels 60–64, having different wavelengths $\lambda_0$–$\lambda_4$, respectively, and bandwidths 70–74, respectively. Additional data channels or fewer data channels having their respective wavelengths may also be carried on the optical fiber 29. Alternatively, some of the data channels 60–64 may be carried in the opposite direction over fiber 28, instead of over fiber 29.

Coupler 34 combines the LME side tone 18 having a wavelength $\lambda_T$ with the data channels onto fiber 29. $\lambda_T$ is different from the wavelengths of all other channels carried on the fiber. In addition, the LME side tone 18 has a frequency outside of the frequency bandwidth of all other channels transmitted over fibers 28 and 29. As a result, the LME side tone 18 does not attenuate or interfere with the data channels. The LME side tone 18 may be inserted at the edge of the spectral bandwidth of the system as shown in FIG. 3A, or inserted between data channels as shown in FIG. 3B. For example, $\lambda_2$ may be 1555 nm, $\lambda_3$ may be 1556 nm, and $\lambda_T$ may be inserted between these two data channels at a wavelength of 1555.5 nm. The power of LME side tone 18 may be adjusted by laser 16 and should be set significantly below the power level of the data signals communicated over fibers 28 and 29 to minimize the impairment of the data signals.

Figure 4:
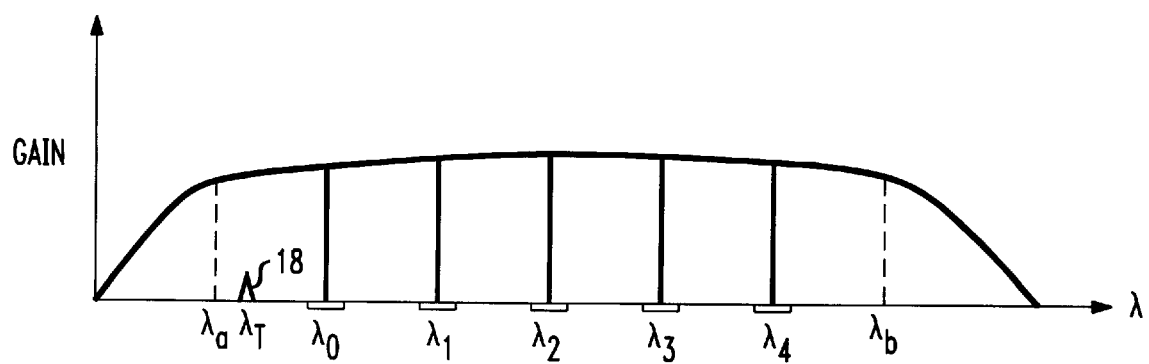
FIG. 4 illustrates the insertion of an LME side tone within the spectral bandwidth of a system according to an embodiment of the present invention.

FIG. 4 illustrates the spectral bandwidth of the system and is defined by the lower limit $\lambda_a$ and the upper limit $\lambda_b$. For example, FIG. 4 may represent the gain characteristics of one or more of the repeaters or amplifiers in the system which limit and define the spectral characteristics of the system. The upper and lower limits of the spectral bandwidth of the system specifies the range of wavelength values where LME side tone 18 may be inserted. For example, as shown in FIG. 4, LME side tone 18 (wavelength of $\lambda_T$) may be inserted between the lower limit $\lambda_a$ and the first data channel (wavelength of $\lambda_0$). The LME side tone 18 may be inserted anywhere between limits $\lambda_a$ and $\lambda_b$, so long as LME side tone 18 has a frequency outside the frequency bandwidth of the data channels on the system.

In addition, LME 12 may measure the spectral bandwidth of the system by moving LME side tone 18 to different positions (or wavelengths) and analyzing the resulting signals returned to LME 12 from repeaters 36 and 44 at each position. For example, when the EME side tone 18 is inserted at a wavelength which is outside of the spectral bandwidth of the system, limiting components in the system (such as repeaters or amplifiers) will attenuate or reject some or all of the LME side tone 18. In such case, the attenuated or nonexistent LME side tone returned to LME 12 can be detected by the computer or system connected to the output of comparator/correlator 22.

The manner in which LME 12 processes LME side tone 18 to monitor the optical transmission system is disclosed with reference to FIGS. 2–4. LME 12 generates LME side tone 18 for use in monitoring the fiber optic transmission system. Coupler 34 combines the plurality of WDM data channels 32 transmitted by transmitter 30 with the LME side tone 18 for transmission over fiber 29. The combined signal is amplified by first repeater 36. Loop-back coupler 42 within repeater 36 returns a portion of the combined signal to LME 12 over fiber 28. Second repeater 44 similarly amplifies and returns a portion of the combined signal to LME 12 over fiber 28 and signal 52. Therefore, after transmitting LME side tone 18, LiME 12 receives a delayed feedback (the returned LME side tone) from each respective repeater via signal 52.

Optical filter 26 receives the combined signals from loop-back couplers 42 and 50 via signal 52. Optical filter 26 is wavelength selective and passes only the wavelength ($\lambda_T$) of the LiME side tone 18 received from loop-back couplers 42 and 50 and rejects the wavelengths (i.e., $\lambda_0$–$\lambda_4$ is shown in FIGS. 3A and 3B) of the WDM data. As a result, the wavelength ($\lambda_T$) of the LME side tone 18 must be different from the wavelengths of other signals carried on fibers 28 and 29 so that filter 26 may pass only the wavelength ($\lambda_T$) of the returned LME side tone. Because the frequency of LME side tone 18 is outside the bandwidths of the data channels carried on the fiber, insertion of LME side tone 18 does not attenuate or interfere with the data channels.

The LME side tones returned to LME 12 by each repeater via fiber 28 and signal 52 are delayed from the original LME side tone 18 a time period proportional to the distance of the delay path for each repeater. For the first repeater 36, the time delay $t_1$ is proportional to the distance $d_1$ of the delay path through the first repeater. The distance $d_1$ may be calculated as the distance from the PRS tone generator 14, to transmitter 16, to coupler 34, to first repeater 36, through loop-back coupler 42, to the optical filter 26, and to comparator/correlator 22. The time delay $t_1$ for the LME side tone returned by the first repeater 36 may therefore be calculated as $t_1 = d_1/c$, where c is the speed of light.

Similarly, the time delay $t_2$ for the LME side tone returned by the second repeater 44 can be calculated based on the known distance, $d_2$, of the delay path for the second repeater 44, and may be calculated as $t_2 = d_2/c$. Likewise, time delays ($t_3$, $t_4$, $t_5$, . . . ) for additional repeaters (not shown) in the system can also be calculated based on the known distances of their delay paths.

Comparator/correlator 22 correlates the PRS tones output by PRS tone generator 14 with each of the returned LME side tones. To perform this correlation operation, delay system 20 receives the PRS tones from PRS tone generator 14 and outputs a plurality of delayed PRS tones to comparator/correlator 22. Delay system 20 outputs each PRS tone after the time delays corresponding to each repeater: $t_1$ (corresponding to time delay for the first repeater 36), $t_2$ (corresponding to the time delay for the second repeater 44), $t_3$, $t_4$, etc., for each repeater in the system. In other words, delay system 20 delays the PRS tones based on the location of each repeater. This process is repeated for each PRS tone received by the delay system 20.

Comparator/correlator 22 compares or correlates the delayed LME side tone returned from each repeater with correspondingly delayed PRS tones generated by PRS tone generator 14. Comparator/correlator 22 outputs a result 24 of the correlation operation that may be used by a computer or other system (not shown) for monitoring the fiber optic transmission system, including detecting and diagnosing the location of faults or other problems. In this manner, the monitoring system of the present invention allows multiple channels in an optical transmission system to be simultaneously monitored with minimal data attenuation or degradation.

It should, of course, be understood that while the present invention has been described in reference to specific hardware configurations, alternate configurations are possible. For example, the PRS tone generator, delay system, and comparator/correlator can be either optical components or electrical components.

What is claimed is:

1. A test system for monitoring a WDM transmission system, comprising:
   a tone generator generating a pseudo-random sequence tone;
   a laser transmitter coupled to said tone generator and generating a test signal based on the pseudo-random sequence tone;
   an optical coupler combining the test signal with a data signal having a data channel, the test signal having a frequency outside the frequency bandwidth of the data channel;
   a repeater coupled to said optical coupler and having an optical loopback;
   an optical filter coupled to said repeater;
   a delay system coupled to said tone generator and delaying the test signal based on a location of said repeater;
   a comparator coupled to said delay system and said optical filter, said comparator correlating the output of the delay system with the output of the optical filter.

2. A test system for monitoring a WDM transmission system, comprising:
   a line monitoring equipment (LME), comprising:
   a) a tone generator generating a pseudo-random sequence tone;
   b) a laser transmitter coupled to said tone generator and generating a test signal based on the pseudo-random sequence tone, said test signal having a frequency;
   c) an optical filter for passing only the frequency of the test signal;
   d) a delay system coupled to said tone generator; and
   e) a correlator coupled to said delay system and said optical filter, said correlator correlating an output of the delay system with an output of the optical filter;
   an optical coupler combining the test signal with a data signal into a combined signal, said data signal having a data channel, the test signal having a frequency outside the frequency bandwidth of the data channel;
   a repeater coupled to said optical coupler and having an optical loopback, said loopback returning a portion of the combined signal to the optical filter of the LME; and
   said delay system delaying the test signal based on a location of said repeater.

3. The test system of claim 1 wherein said tone generator, said laser transmitter, said delay system and said comparator comprise a portion of a line monitoring equipment.

4. The test system of claim 1 wherein the frequency of the test signal is within the spectral bandwidth of the WDM transmission system.

5. The test system of claim 1 wherein said repeater comprises a plurality of optical repeaters located at different locations along the WDM transmission system, each said optical repeater includes an optical loopback.

6. The test system of claim 1 wherein said optical filter is wavelength selective and passes only the wavelength of the test signal.

7. The test system of claim 1 wherein said optical loopback returns a portion of a combined signal that includes the test signal and the data signal.

8. The test system of claim 7 wherein said optical filter receives the return signal from the optical loopback including the test signal and the data signal, the optical filter being wavelength selective and passing only the wavelength of the test signal to the comparator.

9. The test system of claim 1 wherein said test signal has a frequency located near the edge of the spectral bandwidth of the WDM transmission system.

10. The test system of claim 1 wherein said data signal comprises a plurality of data signals, each said data signal having a data channel, said test signal having a frequency outside the frequency bandwidths of the data channels on the WDM transmission system.

11. The test system of claim 10 wherein said test signal has a frequency located near the edge of the spectral bandwidth of the WDM transmission system.

12. The test system of claim 10 wherein said test signal has a frequency located between two of said data channels on said WDM transmission system.

13. The test system of claim 2 wherein the frequency of the test signal is within the spectral bandwidth of the WDM transmission system.

14. The test system of claim 2 wherein said repeater comprises a plurality of optical repeaters located at different locations along the WDM transmission system, each said optical repeater includes an optical loopback.

15. The test system of claim 2 wherein said data signal comprises a plurality of data signals, each said data signal having a data channel, said test signal having a frequency outside the frequency bandwidths of the data channels on the WDM transmission system.

16. The test system of claim 15 wherein said test signal has a frequency located near the edge of the spectral bandwidth of the WDM transmission system.

17. The test system of claim is wherein said test signal has a frequency located between two of said data channels on said WDM transmission system.

* * * * *